(12) United States Patent
Vial et al.

(10) Patent No.: US 11,186,034 B2
(45) Date of Patent: Nov. 30, 2021

(54) METHOD OF FABRICATING A PART BY ADDITIVE MANUFACTURING

(71) Applicant: SAFRAN AIRCRAFT ENGINES, Paris (FR)

(72) Inventors: Matthieu Vial, Moissy-Cramayel (FR); Sebastien Dreano, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 287 days.

(21) Appl. No.: 16/068,511

(22) PCT Filed: Jan. 3, 2017

(86) PCT No.: PCT/FR2017/050003
§ 371 (c)(1),
(2) Date: Jul. 6, 2018

(87) PCT Pub. No.: WO2017/118806
PCT Pub. Date: Jul. 13, 2017

(65) Prior Publication Data
US 2019/0022927 A1 Jan. 24, 2019

(30) Foreign Application Priority Data
Jan. 7, 2016 (FR) ...................................... 1650106

(51) Int. Cl.
*B29C 64/153* (2017.01)
*B33Y 80/00* (2015.01)
(Continued)

(52) U.S. Cl.
CPC ............ *B29C 64/153* (2017.08); *B22F 3/105* (2013.01); *B22F 10/20* (2021.01); *B29C 64/393* (2017.08);
(Continued)

(58) Field of Classification Search
CPC ..... B29C 64/153; B29C 64/393; B29C 64/40; B33Y 10/00; B33Y 50/00; B33Y 50/02
See application file for complete search history.

(56) References Cited

U.S. PATENT DOCUMENTS

2008/0014457 A1* 1/2008 Gennaro ............ B23K 15/0086
428/546
2013/0341838 A1 12/2013 Vilaro et al.
(Continued)

FOREIGN PATENT DOCUMENTS

DE 10 2013 218 760 A1 3/2015
WO WO 2012/131481 A1 10/2012
(Continued)

OTHER PUBLICATIONS

International Search Report dated Apr. 10, 2017 in PCT/FR2017/050003 filed Jan. 3, 2017.

*Primary Examiner* — Kelly M Gambetta
(74) *Attorney, Agent, or Firm* — ObLon, McClelland, Maier & Neustadt, L.L.P.

(57) ABSTRACT

A method is for fabricating a part by additive manufacturing while sparing certain particularly sensitive surfaces of the part, and in particular surfaces that have an influence on the aerodynamics of the final part. The method includes the following steps: providing a digital model of a part that is to be fabricated, the part that is to be fabricated including at least one surface that is to be spared, and orienting the digital model relative to a construction direction wherein the part is to be constructed in such a manner that the surface that is to be spared presents a construction angle greater than 30°, preferably greater than 50°.

13 Claims, 3 Drawing Sheets

(51) Int. Cl.
| | |
|---|---|
| *B22F 3/105* | (2006.01) |
| *B33Y 50/00* | (2015.01) |
| *B29C 64/40* | (2017.01) |
| *B33Y 10/00* | (2015.01) |
| *B33Y 50/02* | (2015.01) |
| *B29C 64/393* | (2017.01) |
| *B22F 5/04* | (2006.01) |
| *B22F 10/30* | (2021.01) |
| *B29L 31/00* | (2006.01) |
| *F01D 5/34* | (2006.01) |
| *F01D 5/18* | (2006.01) |
| *F01D 9/04* | (2006.01) |
| *B22F 10/20* | (2021.01) |

(52) U.S. Cl.
CPC .............. *B29C 64/40* (2017.08); *B33Y 10/00* (2014.12); *B33Y 50/00* (2014.12); *B33Y 50/02* (2014.12); *B33Y 80/00* (2014.12); *F01D 5/187* (2013.01); *F01D 5/34* (2013.01); *F01D 9/04* (2013.01); *F01D 9/044* (2013.01); *B22F 5/04* (2013.01); *B22F 10/30* (2021.01); *B29L 2031/7504* (2013.01); *Y02P 10/25* (2015.11)

(56) References Cited

U.S. PATENT DOCUMENTS

| | | |
|---|---|---|
| 2014/0300017 A1 | 10/2014 | Wighton et al. |
| 2014/0303942 A1 | 10/2014 | Wighton et al. |
| 2015/0258609 A1 | 9/2015 | Teulet |
| 2015/0352770 A1 | 12/2015 | Busenbecker |
| 2016/0067740 A1* | 3/2016 | Voris ................... B29C 64/118 427/402 |
| 2016/0129645 A1 | 5/2016 | Wighton et al. |
| 2016/0144574 A1* | 5/2016 | Eilken ................. B29C 64/386 264/129 |
| 2016/0175932 A1 | 6/2016 | Dimter et al. |
| 2016/0243620 A1 | 8/2016 | Butcher |

FOREIGN PATENT DOCUMENTS

| | | |
|---|---|---|
| WO | WO 2015/019070 A1 | 2/2015 |
| WO | WO 2015/088852 A1 | 6/2015 |

\* cited by examiner

METHOD OF FABRICATING A PART BY ADDITIVE MANUFACTURING

FIELD OF THE INVENTION

The present disclosure relates to a method of fabricating a part by additive manufacturing that serves to spare certain particularly sensitive surfaces of the part, and in particular surfaces that have an influence on the aerodynamics of the final part.

Such an additive manufacturing method is particularly adapted to fabricating complex parts having sensitive surfaces, in particular for use in the field of aeronautic.

STATE OF THE PRIOR ART

In the field of aeronautic in particular, it is now known to make use of additive manufacturing methods for making certain parts of shapes that are thin or complex.

A conventional example of additive manufacturing is fabricating by using a high-energy beam for melting or sintering particles of powder. Such high-energy beams include in particular laser beams and electron beams.

The term "selective laser melting (SLM)", also known as laser beam melting (LBM), refers to a method having the following main characteristics summarized below with reference to FIG. 1, which shows a conventional device for fabricating a part by selectively melting or sintering beds of powder by means of a laser beam.

A first powder layer 10a of a material is deposited onto a construction platform 21, e.g. by using a spreader tool 20 such as a roller, (which platform may be a platform on its own, or it may be a platform surmounted by a solid support, or it may be a portion of some other part, or it may be a support grid that is used to facilitate constructing certain parts).

The powder is taken from a feed bin 22 during a go movement of the roller 20, and it is then scraped, and possibly compacted a little, during one or more return movements of the roller 20. The powder is made up of particles 11. Excess powder is recovered in a recycling bin 23 situated adjacent to the construction bin 24 in which the construction platform 21 moves vertically.

Use is also made of a generator 30 for generating a laser beam 31 in association with a control system 32 suitable for aiming the beam 31 onto any region of the construction platform 21 in order to scan any region of a previously-deposited powder layer. The laser beam 31 is shaped and its diameter on the focal plane is varied respectively by means of a focusing system 33 and a beam expander 34, together constituting the optical system.

Thereafter, a region of this first powder layer 10a is raised to a temperature higher than the melting temperature of the powder by scanning it with a laser beam 31.

That type of additive manufacturing method can make use of any high-energy beam instead of the laser beam 31, and in particular it can make use of an electron beam, so long as the beam has sufficient energy to melt the powder particles and a portion of the material on which the particles rest.

By way of example, the scanning of the beam is performed by a galvanometer scan head that forms part of a control system 32. For example, the control system has at least one steerable mirror 35 on which the laser beam 31 is reflected prior to reaching a powder layer where each point of its surface is always situated at the same height relative to the focusing lens contained in the focusing system 34, the angular position of the mirror being controlled by a galvanometer scan head so that the laser beam scans at least a region of the first powder layer, thereby following a pre-established profile for the part. For this purpose, the galvanometer scan head is controlled using information contained in the database of the computer tool used for the computer-assisted design and fabrication of the part that is to be fabricated.

Thus, the powder particles 11 in that region of the first layer 10a are melted and form a first single-piece element 12a that is secured to the construction platform 21. At this stage, it is possible to use the laser beam to scan a plurality of independent regions in the first layer so as to form a plurality of mutually disjoint first elements 12a after melting and solidifying the material.

The construction platform 21 is lowered through a height corresponding to the thickness of the first powder layer 10a (lying in the range 20 micrometers (μm) to 100 μm, and generally in the range 30 μm to 50 μm).

Figure 1:
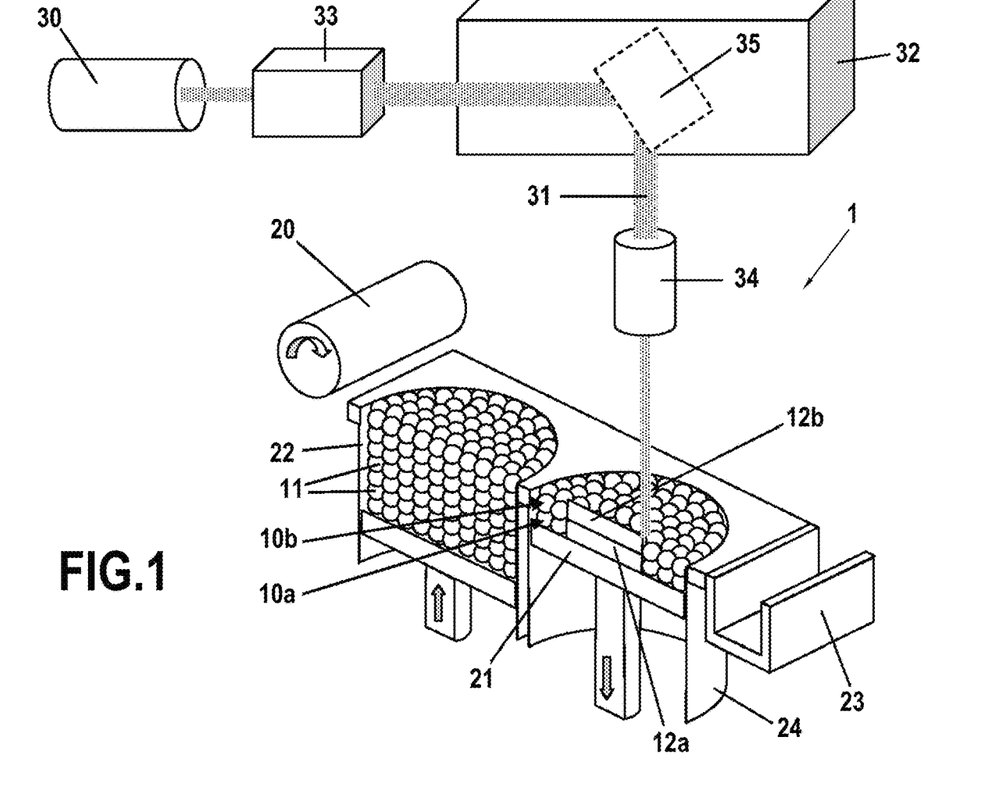
FIG. 1 is an overall view of a device for additive manufacturing by selective melting of powder beds.

Thereafter, a second powder layer 10b is deposited on the first layer 10a and on the first single-piece or consolidated element 12a, with a region of the second layer 10b that is situated in part or completely over the first single-piece or consolidated element 12a as shown in FIG. 1 then being heated by exposure to the laser beam 31 in such a manner that the powder particles of this region of the second layer 10b are melted together with at least a portion of the element 12a so as to form a second single-piece or consolidated element 12b, with these two elements 12a and 12b together forming a single-piece block, as shown in FIG. 1.

Such an additive manufacturing technique thus provides excellent control over the shape of the part to be fabricated and makes it possible to make parts that are very complex.

Nevertheless, while making parts of complex shape, certain portions of the part are to be found temporarily cantilevered out to a great extent, or even to be without any support other than the underlying volume of non-solidified powder, which thus presents a risk of collapsing in the fabrication bin. This applies in particular to portions of the part that are substantially parallel to the fabrication platform. Under such circumstances, it is then necessary to fabricate the part together with supports in order to hold those portions during the fabrication stage.

However, once fabrication has finished, and while those supports are being removed, residues remain at the interfaces between the supports and the part. Consequently, the resulting part includes zones in which the surface state is not uniform. Such a non-uniform surface state, when it occurs in sensitive zones of the part (e.g. zones that come into contact with an air stream), can disturb the flow of the fluid and thus degrade the aerodynamic properties and therefore the efficiency of the machine in question.

In order to solve that problem, one solution that is presently in use consists in manually polishing those zones in order to eliminate such residues.

Nevertheless, that operation presents the drawback of being expensive (use of labor, time of operation, and additional equipment needed), and can also have an impact on the shapes of the zones in question, in the event that the manual polishing is not performed correctly by the operator.

There therefore exists a real need for a method of fabricating a part by additive manufacturing that makes it possible to spare certain particularly sensitive surfaces of the part, and in particular surfaces that have an influence on the aerodynamics of the final part.

SUMMARY OF THE INVENTION

The present disclosure provides a method of fabricating a part by additive manufacturing, the part that is to be fabricated including at least one surface that is to be spared, the method comprising the following steps:

providing a digital model of the part that is to be fabricated; and orienting the digital model relative to a construction direction in which the part is to be constructed in such a manner that the surface that is to be spared presents a construction angle greater than 30°.

In the present disclosure, the term "construction direction" should be understood as the direction in which the part is constructed, i.e. in which the powder layers or fabrication layers are stacked on one another. For example, when the part is fabricated on a construction platform, the construction direction corresponds to a direction orthogonal to said construction platform. The term "construction plane" then designates a plane orthogonal to the construction direction and substantially parallel to the construction platform.

Furthermore, in the present disclosure, the terms "axial", "radial", "tangential", "inner", "outer", and their derivatives are defined relative to the main axis of the turbine engine; the term "axial plane" designates a plane containing the main axis of the turbine engine and the term "radial plane" designates a plane perpendicular to the main axis; finally, the terms "upstream" and "downstream" are defined relative to the flow of air through the turbine engine.

The term "construction angle" is used to mean the angle between a main direction of the part that is to be fabricated and a plane orthogonal to the construction direction, e.g. the construction platform. Locally, at a given point of the part, forming a portion of a given fabrication layer, the construction angle corresponds to the angle measured in a plane orthogonal to the construction angle between the construction plane and the straight line connecting the point in question of the part through the closest point of the part forming a portion of the underlying fabrication layer.

The digital model of the part that is to be fabricated is oriented so as to avoid including supports engaging the surfaces that are to be spared. Specifically, the inventors have observed that from a construction angle of about 30°, the layer of the part that is being fabricated benefits from sufficient attachment to the solidified portion of the underlying fabrication layer to be able to stay in position during fabrication of the part without any need for additional holder means. There is therefore no need to include supports engaging said surface. Thus, by orienting the model in such a manner that said surfaces that are to be spared present a construction angle greater than 30°, supports need to be included only for zones other than said zones that are to be spared.

Consequently, by means of this method, the resulting final part presents a uniform surface state on the surfaces that are to be spared, so those surfaces do not present any residue caused by such supports. It is therefore possible to omit a step of manually polishing the surfaces that are to be spared once the final part has been obtained. This presents the advantage of avoiding an operation that leads to additional costs (time for carrying out polishing, tooling), and that can have an impact on the shapes of those surfaces, and thus on the properties of the final part. Thus, the method facilitates making a part that is of complex shape and that requires great geometrical accuracy in certain zones.

In some embodiments, the digital model is oriented relative to the construction direction in such a manner that the surface that is to be spared presents a construction angle greater than 50°.

In some embodiments, the part that is to be fabricated is an aeronautic part, and the surface that is to be spared of the part that is to be fabricated is a surface configured to be in contact with a stream of a working fluid.

For example, the working fluid may be the air flowing through the aeronautic part. The surfaces of the aeronautic part that are in contact with the air stream thus have an impact on the overall aerodynamics of the part: they thus need to have a surface state that is as uniform as possible in order to limit the appearance of any aerodynamic disturbances in the air stream. Consequently, the present method makes it possible to spare those surfaces in contact with the stream of the working fluid and thus to preserve the aerodynamic properties of the part.

In some embodiments, the part that is to be fabricated is a sector of a bladed stator ring, e.g. a set of guide vanes for a high-pressure compressor.

In some embodiments, the surface that is to be spared is a surface of a vane portion. The vane portion may comprise a leading edge, a trailing edge, a pressure side, and a suction side.

In some embodiments, a surface that is to be spared is a surface of a vane portion, wherein the digital model of the part that is to be fabricated is oriented in such a manner that the main direction of said vane portion forms an angle greater than 30° relative to a plane orthogonal to the construction direction, in other words relative to the construction platform.

In the present disclosure, the main direction of the vane portion is the direction in which the vane portion extends. When said main direction forms an angle greater than 30° relative to the construction platform, and consequently less than 60° relative to the construction direction, it is possible to make the vane portion without using a support engaging said surface of the vane portion. This makes it possible to avoid the presence of any residue on said vane portion and thus to preserve the aerodynamic properties of said vane portion.

In some embodiments, the surface that is to be spared is a surface of a passage portion. The passage portion may in particular be an inner or outer shroud of a turbine engine module or a sector of such a shroud. The term "passage portion" is used to mean a surface defining at least a portion of the air passage, i.e. a surface that defines the passage in which the air stream flows.

In some embodiments, the digital model of the part that is to be fabricated is oriented in such a manner that the main direction of said passage portion forms an angle greater than 30° relative to a plane orthogonal to the construction direction, in other words relative to the construction platform.

In the present disclosure, the main direction of the passage portion may be seen as the flow direction of the working fluid along the passage portion. When the passage portion is a shroud, the main direction of the passage portion then corresponds to the axial direction of the shroud, i.e. the direction parallel to the central axis of said shroud. When said main direction forms an angle greater than 30° relative to the construction platform, and consequently less than 60° relative to the construction direction, it is possible to make the passage portion without using any support engaging said surface of the passage portion. This makes it possible to avoid the presence of any residue on said passage portion and to preserve the aerodynamic properties of said passage portion by avoiding introducing aerodynamic disturbances in the flow of the working fluid.

In some embodiments, the part that is to be fabricated includes at least one elongate portion having a front face and a side face, the front face being narrower than the side face, and the model is oriented relative to a scanning direction corresponding to the travel direction of a spreader tool in such a manner that the front face of the elongate portion is oriented substantially facing the spreader tool when it moves in the scanning direction.

The term "substantially facing the spreader tool" should be understood as meaning that the angle formed between the direction in which the elongate portion extends in a construction plane and the scanning direction is small enough to ensure that when the spreader tool reaches the elongate portion it meets its front face first. This angle is preferably less than 30°, more preferably less than 20°. During fabrication of the part, this presents the advantage of minimizing the surface area of the elongate portion that faces the spreader tool as it moves in the scanning direction, and consequently of minimizing any risk of blocking the spreader tool. Specifically, during fabrication of the part, with the spreader tool moving in the scanning direction in order to deposit the powder layer by layer, there is a possibility of the tool coming into abutment against a surface of the part in the preceding fabrication layer, i.e. the underlying fabrication layer. This can happen in particular with such elongate portions that might deform a little during fabrication. Consequently, minimizing this surface area by orienting the part in appropriate manner serves to reduce the magnitude of the impact in the event of the spreader tool meeting the part under construction, and thus to reduce any risk of damaging the spreader tool or the part under construction.

In some embodiments, the spreader tool is a scraper, e.g. a roller, configured to put the fabrication part into place in an additive manufacturing machine.

In some embodiments, the elongate portion corresponds to a vane portion of the part that is to be fabricated.

In some embodiments, the front face of the elongate portion corresponds to the leading edge or the trailing edge of said vane portion, and the model is oriented in such a manner that said leading edge or said trailing edge is oriented substantially facing the roller when it moves in the scanning direction. In the horizontal plane, the chord of said vane portion is preferably oriented so as to form an angle with the scanning direction that is less than 30°, preferably less than 20°. In addition, when making a bladed stator ring or a sector of the bladed stator ring, this configuration makes it possible for the vane portions to be arranged so that the spreader tool can pass continuously and without tilting from the top of one vane portion that is being fabricated to the next.

In some embodiments, the method includes a step of modifying the model wherein at least one edge of the model that is oriented substantially facing the spreader tool when it moves in said scanning direction is chamfered. During fabrication of the part, this presents the advantage of minimizing any risk of the spreader tool being blocked. Specifically, when an edge is not chamfered, it might deform under the effect of the heat caused by laser melting, thereby creating surface irregularities on the part that might block the spreader tool as it moves in order to deposit the powder of the following layer.

In some embodiments, the method includes a step of adding support portions to the digital model in order to construct supports that are suitable for supporting the part that is to be fabricated while it is being fabricated, the support portions being positioned in such a manner that no support portion comes into contact with the surface that is to be spared during fabrication. This presents the advantage of holding the part in position while it is being fabricated, while sparing the surfaces of the part that are to be spared, such that at the end of fabrication, those surfaces do not present residues degrading the state of their surfaces, and thus avoiding a manual polishing operation that might modify their aerodynamic properties.

In some embodiments, the supports are in the form of columns or of perforated walls.

In some embodiments, at least one inter-support reinforcing portion is added to the digital model to connect together at least two adjacent support portions, said inter-support reinforcing portion being disjoint from the surface that is to be spared. Said inter-support reinforcing portion may be arranged transversely, e.g. perpendicularly to said adjacent support portions, and it may be arranged so as to pass under the surface that is to be spared. Installing inter-support reinforcement serves to reinforce the mechanical strength of the supports connected together in that way, e.g. so as to avoid certain supports deforming or creeping completely under the weight of the part. This serves to improve overall holding of the part during its fabrication, while sparing the surfaces that are to be spared of the part that is to be fabricated.

In some embodiments, at least one hold is provided through at least a portion of the support of the model. This presents the advantage of enabling unused powder to be recovered and recycled at the end of fabrication.

In some embodiments, at least one support portion includes a groove or at least two segments that are spaced apart by a gap. The groove or gap may correspond to spaces that are not melted during fabrication. When fabrication of the part has terminated, this presents the advantage of being able to remove the supports quickly and easily by hand.

In some embodiments, the method further comprises a step of making the part that is to be fabricated layer by layer using an additive manufacturing technique based on the digital model.

In some embodiments, the method further comprises a step of removing the supports.

In some embodiments, the supports are removed manually.

In some embodiments, the method comprises a step of automatically polishing the surface that is to be spared of the resulting part. This automatic polishing step is preferably performed immediately after the step of removing the supports, without any prior manual polishing step.

BRIEF DESCRIPTION OF THE DRAWINGS

The invention and its advantages can be better understood on reading the following detailed description of various implementations of the invention given as non-limiting examples. The description refers to the accompanying sheet of figures, in which.

DETAILED DESCRIPTION OF IMPLEMENTATIONS

Figure 2A:
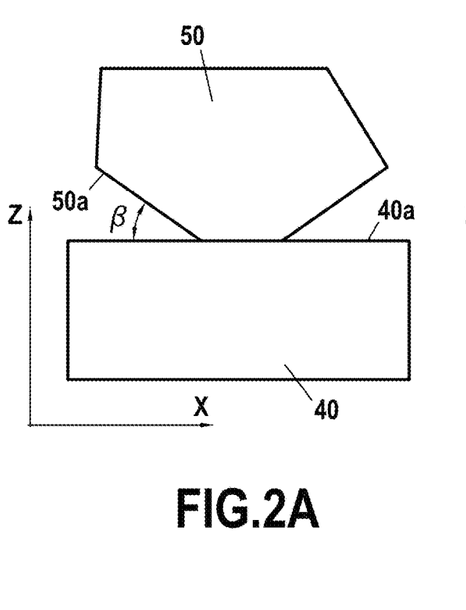
FIGS. 2A and 2B are elevation views of an example model of a part that is to be fabricated.
Figure 2B:
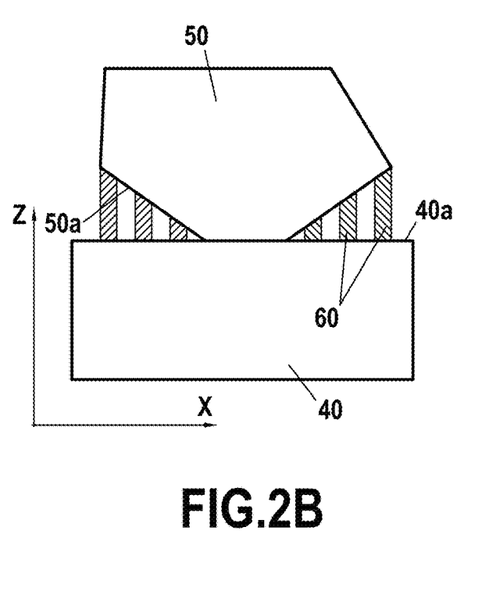

FIGS. 2A and 2B are elevation views of a model 50 of a part that is to be fabricated on a construction platform 40 by an additive method of fabricating a part. The direction of construction, corresponding to the axis Z, is perpendicular to the construction plane that corresponds to the top surface 40a of the construction platform 40. A surface 50a of the model 50 of the part presents a construction angle β relative to the surface 40a of the construction platform. When this construction angle β is less than 30°, the surface 50a runs the risk of collapsing during fabrication: it is then preferable to arrange supports 60 for the surface 50a of the model 50 of the part in order to hold this surface 50a while the part is being fabricated.

Figure 3:
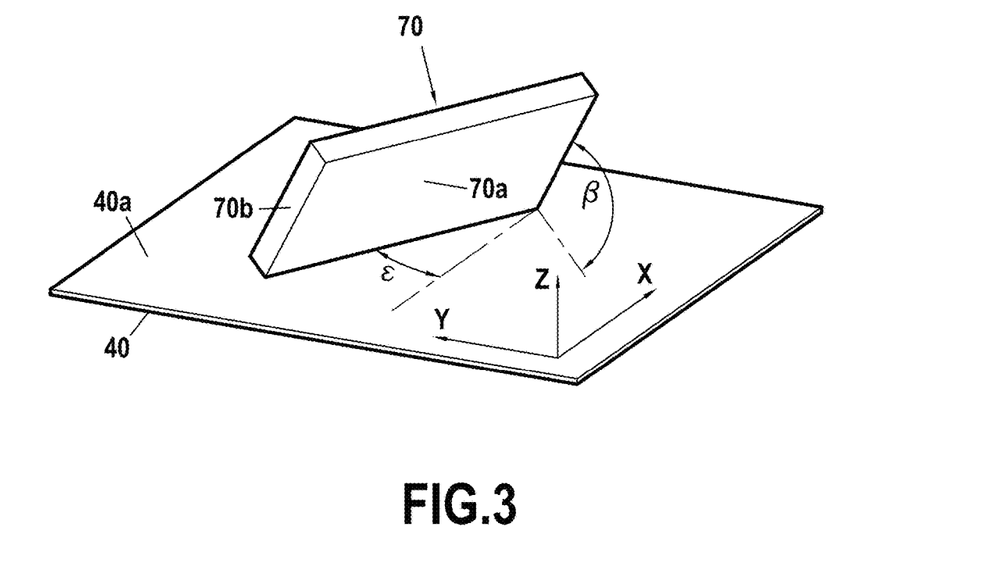
FIG. 3 is a perspective view of an example model of a part that includes an elongate portion.

FIG. 3 is a perspective view of a model 70 of a portion that is elongate in the meaning of the present disclosure. The elongate portion has a front face 70b and a side face 70a, the front face 70b being narrower than the side face 70a. The construction direction, corresponding to the axis Z, is perpendicular to the top surface 40a of the construction platform 40, which extends in the X-Y plane, and the scanning direction corresponds to the travel direction of the spreader tool, e.g. a roller, that moves along the direction X. The side face 70a presents a construction angle β relative to the X-Y plane, and the direction in which the model 70 of the elongate portion extends in the X-Y construction plane presents an angle ε relative to the scanning direction X.

As explained above, in the teaching of the present disclosure, the model 70 of the elongate portion is oriented in such a manner that the angle β is greater than 30° so as to avoid putting supports into place for holding the face 70a during fabrication of the part. Furthermore, in order to minimize the surface area of the part facing the spreader tool while it is moving in the scanning direction, it is preferable to minimize the angle F so that the elongate portion extends substantially in the scanning direction. Thus, when the spreader tool moves to deposit a top powder layer, it substantially faces the front face 70b. Since the front face 70b is small compared with the side face 70a, this minimizes any risk of the spreader tool becoming blocked by coming into abutment against said front face.

Figure 4:
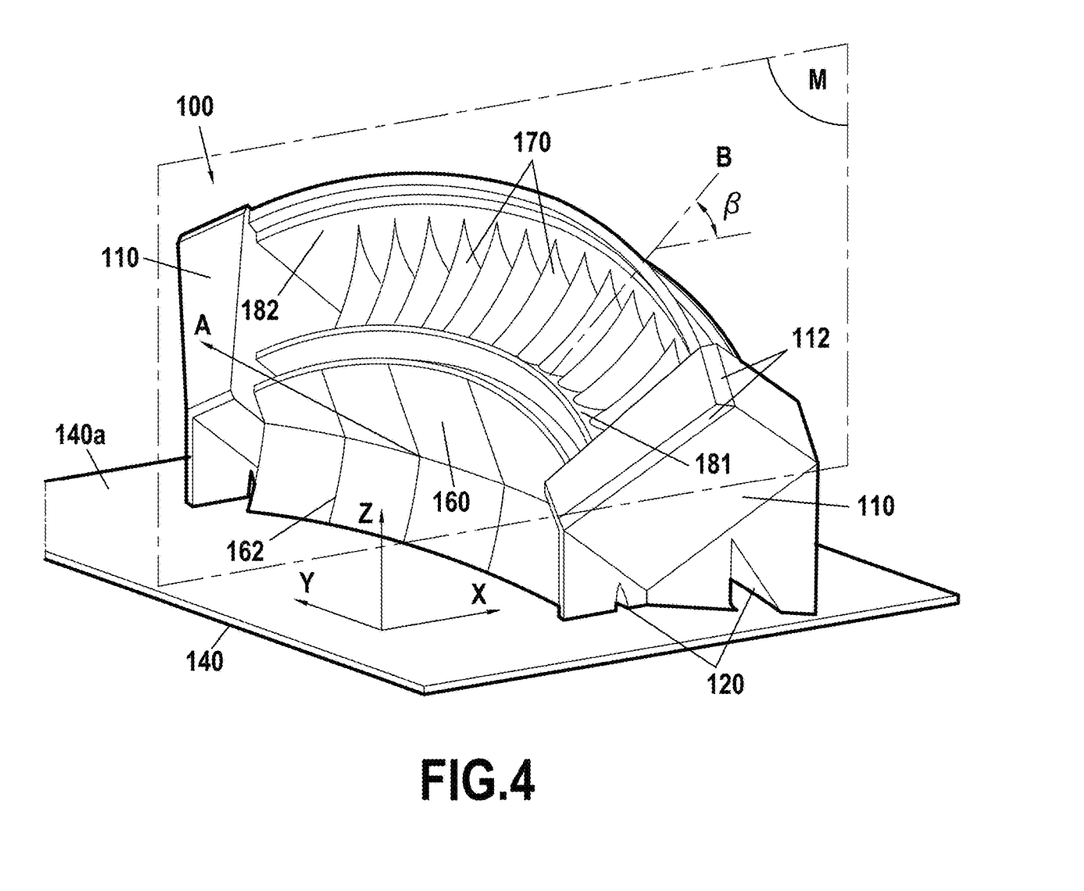
FIG. 4 is a perspective view of an example model of an aeronautic part that is to be fabricated.
Figure 5:
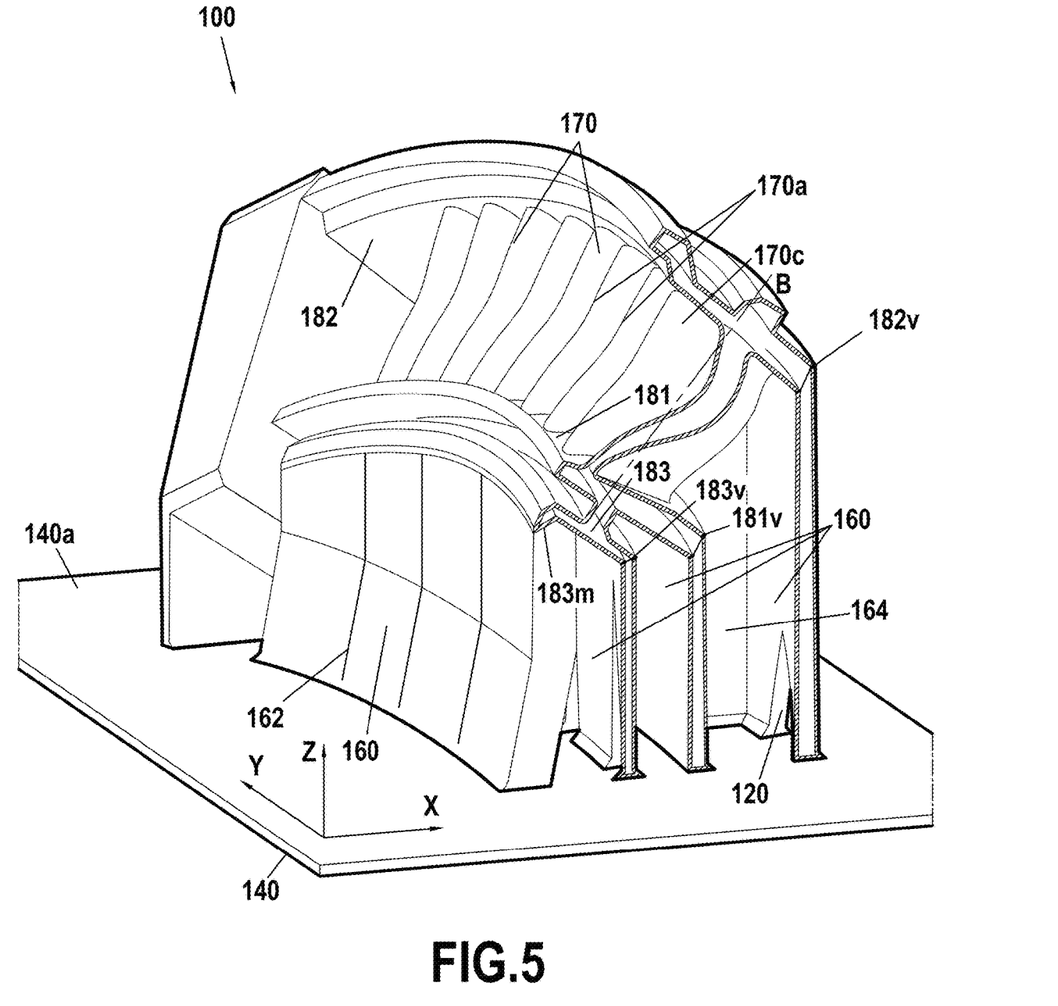
FIG. 5 is a section view of the model of FIG. 4.

With reference to FIGS. 4 and 5, there follows a description of an example method of fabricating a part by additive manufacturing. In this example, the part that is to be fabricated is a stator sector of a high-pressure compressor of a turbine engine, the sector having a plurality of vanes 170 extending radially between an inner shroud 181 and an outer shroud 182, these inner and outer shrouds 181 and 182 forming a passage in which the stream of working air flows when the turbine engine is in operation. This stator sector also has a ring sector 183 extending concentrically radially inwards from the inner shroud 181 and designed to carry an abradable track for providing sealing with the rotor. The stator sector has an axial direction A that is parallel to the central axis of the complete stator, and also a midplane M. The axial direction A corresponds substantially to the flow direction in operation of the stream of working air through the stator sector.

A first step of the fabrication method seeks to model the part that is to be fabricated, or to acquire such a model that already exists and that is to be modified in accordance with the present disclosure. On this occasion, a holder block 110 is added to the model of the part at each of its circumferential ends, thereby serving to ensure cohesion for the inner and outer shrouds 181 and 182 and for the ring sector 183 during fabrication.

This model is then placed in a fabrication space corresponding to the fabrication machine, and having three orthogonal directions X, Y, and Z. It also includes a model of the construction platform 140 lying in the X-Y plane, and a construction direction extending along the axis Z perpendicular to the X-Y plane and corresponding to the direction in which the successive powder layers are to be stacked during fabrication. Finally, it includes a scanning direction, extending along the axis X, that corresponds to the direction in which the roller used for depositing the powder layer by layer moves.

Thereafter, surfaces that are to be spared are identified in the part that is to be fabricated. In the example of FIG. 4, the surfaces that are to be spared are the surfaces that come into contact with the air passing through the bladed stator ring, i.e. between the vanes 170, the inner shroud 181, and the outer shroud 182.

Thereafter, a step of the fabrication method seeks to take the model 100 of the part as provided in the preceding step, and orient it relative to the X-Y construction plane, i.e. the top surface 140a of the construction platform 140. In this example, the model 100 is oriented in such a manner that the axial direction A of the sector forms an angle of about 55° (±10°) relative to the X-Y construction plane. By orienting the sector in such a manner, the main direction of the shrouds 181 and 182 forms an angle of 55° (±10°) relative to the X-Y construction plane; the main direction B of each of the vanes 170 forms an angle of 35° (±10°) relative to the X-Y construction plane.

Once the model is oriented relative to the X-Y construction plane, it is then modified so as to have support portions 160 enabling the part to be held during fabrication. As a result of the above-mentioned orientation, it is possible to leave the vanes 170 and the shrouds 181 and 182 free from any support. In contrast, it is possible to provide support portions in association with zones other than those surfaces that are to be spared. More precisely, in this example, support portions 160 are arranged in association with the downstream end surface 182v of the outer shroud 182 and the downstream end surface 181v of the inner shroud 181 of the sector. Support portions 160 are also arranged in association with the downstream end surface 183v of the ring 183 and in association with the upstream inside surface 183m, given that the ring 183 is not designed to come into contact with the air stream. Naturally, it is possible to provide support portions 160 freely for the holder blocks 110, since those blocks are to be removed once the part has been fabricated.

While designing the support portions, grooves or gaps 162 are also included so as to subdivide the support 160 into a plurality of segments. These grooves or gaps correspond to spaces that are not melted during fabrication.

Furthermore, the support portions 160 are designed so as to include holes 120 giving easier access to zones of the part that are difficult to access, and also so as to be able to recover and recycle unused powder at the end of fabrication.

Finally, while designing the support portions, inter-support reinforcing portions 164 are arranged transversely between adjacent support portions 160 and they are connected to those supports so as to reinforce the mechanical strength of the supports connected together in this way. These inter-support reinforcing portions 164 may also be provided under the vanes 170 and the shrouds 181 and 182 since they are disjoint from those surfaces, i.e. they do not touch the corresponding surfaces.

Once these steps have been completed, a step is performed seeking to orient the model 100 about the axis Z so that the midplane M of the stator sector is in alignment with the scanning axis X. Thus, in the scanning plane, the chord of each of the vanes 170 forms an angle lying in the range 0° to 30° relative to the scanning axis X, so that the leading edge 170*a* of each vane 170 is substantially facing the roller when it moves in the scanning direction X.

Once this orientation step has been performed, certain edges of the part facing the roller as it moves in the scanning direction X are then identified in the resulting model: these edges are then chamfered. Thus, in the model 100 for the stator sector, the edges 112 of the holder blocks 110 are chamfered. Without having such chamfers, the salient angles of the part might deform during fabrication under the effect of the heat generated by laser melting, thereby running the risk of blocking the spreader tool.

Thereafter, the method includes a step of fabricating the part proper by additive manufacturing on the basis of the resulting modified model.

Once the fabrication method has terminated and the raw fabricated part is obtained, the supports 160 are removed. The resulting part possesses vanes 170 and inner and outer shrouds 181 and 182 presenting a final surface state that is uniform. It is then possible to polish those parts automatically without any need for prior manual polishing, thereby making it possible to preserve the aerodynamic properties of the part.

Although the present invention is described with reference to specific examples, it is clear that modifications and changes may be made to those examples without going beyond the general ambit of the invention as defined by the claims. In particular, individual characteristics of the various implementations shown and/or mentioned may be combined in additional implementations. Consequently, the description and the drawings should be considered in a sense that is illustrative rather than restrictive.

It is also clear that all of the characteristics described with reference to a method can be transposed singly or in combination to a device, and vice versa, all of the characteristics described with reference to a device can be transposed, singly or in combination, to a method.

The invention claimed is:

1. A method of fabricating a bladed stator ring sector by additive manufacturing, the bladed stator ring sector including a surface to be spared, which is a surface of the bladed stator ring sector configured to be in contact with an air stream, the method comprising:
   providing a digital model of the bladed stator ring sector that is to be fabricated;
   orienting the digital model relative to a construction direction, said construction direction being a direction in which the bladed stator ring sector is to be constructed and in which fabrication layers are stacked on one another during additive manufacturing, in such a manner that the surface configured to be in contact with the air stream presents a construction angle greater than 30°, the construction angle being an angle between the surface configured to be in contact with the air stream and a plane orthogonal to the construction direction, and
   making the bladed stator ring sector layer by layer using an additive manufacturing technique based on the digital model,
   wherein making the bladed stator ring sector is performed by staking the fabrication layers during additive manufacturing such that the surface configured to be in contact with the air stream on the bladed stator ring sector presents an angle greater than 30° with the plane orthogonal to the direction in which the fabrication layers are stacked on one another during said additive manufacturing.

2. The method according to claim 1, wherein the surface configured to be in contact with the air stream is a surface of a vane portion, wherein the digital model of the bladed stator ring sector is oriented in such a manner that the main direction of said vane portion forms an angle greater than 30° relative to a plane orthogonal to the construction direction.

3. The method according to claim 1, wherein the surface configured to be in contact with the air stream is a surface of a passage portion, and wherein the digital model of the bladed stator ring sector is oriented in such a manner that the main direction of said passage portion forms an angle greater than 30° relative to a plane orthogonal to the construction direction.

4. The method according to claim 1, wherein the bladed stator ring sector includes at least one elongate portion having a front face and a side face, the front face being narrower than the side face, and wherein the digital model is oriented relative to a scanning direction corresponding to a travel direction of a spreader tool in such a manner that the front face of the elongate portion of the bladed stator ring sector is oriented substantially facing the spreader tool when the spreader tool moves in the scanning direction.

5. The method according to claim 4, wherein the elongate portion corresponds to a vane portion of the bladed ring stator sector and wherein the front face of the elongate portion corresponds to a leading edge or to a trailing edge of said vane portion.

6. The method according to claim 4, further comprising modifying the digital model wherein at least one edge of the digital model that is oriented facing the spreader tool when the spreader tool moves in said scanning direction is chamfered.

7. The method according to claim 1, further comprising adding support portions to the digital model in order to construct supports that are suitable for supporting the bladed stator ring sector while the bladed stator ring sector is being fabricated, and wherein the support portions are positioned in such a manner that no support portion comes into contact with the surface configured to be in contact with the air stream during fabrication, and
   wherein making the bladed stator ring sector with said additive manufacturing is performed without any physical support engaging the surface configured to be in contact with the air stream.

8. The method according to claim 7, wherein at least one inter-support reinforcing portion is added to the digital model to connect together at least two adjacent support portions, said inter-support reinforcing portion being disjoint from the surface configured to be in contact with the air stream.

9. The method according to claim 7, further comprising:
   removing the supports; and
   automatically polishing the surface configured to be in contact with the air stream.

10. The method according to claim 1, wherein the construction angle is greater than 50°.

11. The method according to claim 1, wherein, at a given point of the bladed stator ring sector, forming a portion of a given fabrication layer, the construction angle corresponds to an angle measured in a plane orthogonal to the construction plane between the construction plane and a straight line connecting the given point of the bladed stator ring sector through a closest point of the bladed stator ring sector forming a portion of an underlying fabrication layer.

12. The method according to claim 1, wherein the surface configured to be in contact with the air stream includes all of the surfaces of the part configured to be in contact with the air stream.

13. The method according to claim 1, wherein the bladed stator ring sector includes a plurality of vanes extending radially between an inner shroud and an outer shroud, and wherein the plurality of vanes, the inner shroud, and the outer shroud are free from any support during fabrication of the bladed stator ring sector.

* * * * *